(12) United States Patent
Sun et al.

(10) Patent No.: US 8,372,946 B2
(45) Date of Patent: Feb. 12, 2013

(54) COPOLYETHER GLYCOL MANUFACTURING PROCESS

(75) Inventors: Qun Sun, Wilmington, DE (US); Robert D. Orlandi, Landenberg, PA (US)

(73) Assignee: Invista North America S.A R.L., Wilmington, DE (US)

( * ) Notice: Subject to any disclaimer, the term of this patent is extended or adjusted under 35 U.S.C. 154(b) by 682 days.

(21) Appl. No.: 12/424,120

(22) Filed: Apr. 15, 2009

(65) Prior Publication Data

US 2010/0267926 A1    Oct. 21, 2010

(51) Int. Cl.
  *C08G 65/20* (2006.01)
(52) U.S. Cl. ........ 528/413; 528/416; 528/613; 528/617; 560/240
(58) Field of Classification Search ............ 528/413, 528/416, 613, 617; 560/240
  See application file for complete search history.

(56) References Cited

U.S. PATENT DOCUMENTS

| | | | |
|---|---|---|---|
| 3,282,875 A | 11/1966 | Connolly et al. | |
| 3,308,069 A | 3/1967 | Wadlinger at al. | |
| 3,358,042 A * | 12/1967 | Dunlop et al. | 568/617 |
| 3,702,886 A | 11/1972 | Argauer et al. | |
| 3,925,484 A * | 12/1975 | Baker | 568/617 |
| 4,120,903 A * | 10/1978 | Pruckmayr et al. | 568/617 |
| 4,127,513 A * | 11/1978 | Bellis | 528/413 |
| 4,139,567 A | 2/1979 | Pruckmayr | |
| 4,153,786 A | 5/1979 | Pruckmayr | |
| 4,163,115 A * | 7/1979 | Heinsohn et al. | 560/240 |
| 4,192,943 A * | 3/1980 | Robinson | 528/417 |
| 4,228,272 A * | 10/1980 | Del Pesco | 528/413 |
| 4,439,409 A | 3/1984 | Puppe et al. | |
| 4,564,671 A * | 1/1986 | Mueller | 528/416 |
| 4,585,592 A * | 4/1986 | Mueller | 554/183 |
| 4,677,231 A | 6/1987 | Aoshima et al. | |
| 4,728,722 A | 3/1988 | Mueller | |
| 4,826,667 A | 5/1989 | Zones et al. | |
| 4,952,673 A * | 8/1990 | Mueller | 528/483 |
| 4,954,325 A | 9/1990 | Rubin et al. | |
| 5,118,869 A * | 6/1992 | Dorai et al. | 568/617 |
| 5,149,862 A | 9/1992 | Dorai et al. | |
| 5,236,575 A | 8/1993 | Bennett et al. | |
| 5,250,277 A | 10/1993 | Kresge et al. | |
| 5,268,345 A | 12/1993 | Mueller | |
| 5,362,697 A | 11/1994 | Fung et al. | |
| 6,197,979 B1 | 3/2001 | Becker et al. | |
| 6,362,312 B1 * | 3/2002 | Eller et al. | 528/413 |
| 7,041,752 B2 * | 5/2006 | Schlitter et al. | 526/89 |
| 2004/0220381 A1 * | 11/2004 | Schlitter et al. | 528/408 |

FOREIGN PATENT DOCUMENTS

| GB | 854958 A * | 3/1958 |
|---|---|---|
| GB | 854958 A1 * | 3/1958 |

OTHER PUBLICATIONS

Purification of Solvents for Electroanalysis, Coetzee et al. Pure and Applied Chem. vol. 57, No. 4, pp. 633-638, 1985.*
Purification of Solvents for Electroanalysis: Tetrahydrofuran and Dioxane by Coetzee et. al. 1985.*

* cited by examiner

*Primary Examiner* — James J Seidleck
*Assistant Examiner* — Peter A Salamon
(74) *Attorney, Agent, or Firm* — Robert B. Furr, Jr.; Dennis P. Santini

(57) ABSTRACT

The present invention relates to a continuous process for manufacturing copolyether glycols with high incorporation of alkylene oxide by polymerization of tetrahydrofuran and at least one alkylene oxide in the presence of an acid catalyst, at least one compound containing reactive hydrogen atoms, and a specific diluent or solvent. More particularly, the invention relates to a diluent or solvent-assisted continuous process for manufacturing copolyether glycols with high incorporation of alkylene oxide.

9 Claims, No Drawings

GLYCOL
MANUFACTURING PROCESS

COPOLYETHER GLYCOL MANUFACTURING PROCESS

FIELD OF THE INVENTION

The present invention relates to a continuous process for manufacturing copolyether glycols by polymerization of a reaction mixture comprising tetrahydrofuran and a high concentration of at least one alkylene oxide in the presence of an acid catalyst, at least one compound containing reactive hydrogen atoms, and a specific diluent or solvent. More particularly, the invention relates to a diluent or solvent-assisted continuous polymerization process for manufacturing copolyether glycols with a high molar incorporation of alkylene oxide. Still further, the invention relates to copolyether glycols having a high molar incorporation of alkylene oxide manufactured in a diluent or solvent-assisted continuous polymerization process.

BACKGROUND OF THE INVENTION

Homopolymers of tetrahydrofuran (THF), also known as polytetramethylene ether glycols (PTMEG), are well known for use as soft segments in polyurethanes and other elastomers. These homopolymers impart superior dynamic properties to polyurethane elastomers and fibers. Copolymers of THF and at least one cyclic ether, also known as copolyether glycols, are known for use in similar applications, particularly where the reduced crystallinity imparted by the cyclic ether may improve certain dynamic properties of a polyurethane which contains such a copolymer as a soft segment. Among the cyclic ethers used for this purpose are ethylene oxide and propylene oxide. Copolyether glycols having a high molar incorporation of alkylene oxide, for example at least about 50 mol %, are desirable for higher polarity and hydrophilicity as well as improved dynamic properties, for example low temperature flexibility due to further lower crystallinity, of a polyurethane which contains such a copolymer as a soft segment.

Copolymers of THF and cyclic ether having normal molar incorporations of alkylene oxide, such as for example, from about 28 to about 49 mol %, e.g. from about 30 to about 45 mol %, are well known in the art. Their preparation is disclosed, for example, by Pruckmayr in U.S. Pat. No. 4,139,567 and U.S. Pat. No. 4,153,786. Such copolymers can be prepared by any of the known methods of cyclic ether polymerization, described for instance in "Polytetrahydrofuran" by P. Dreyfuss (Gordon & Breach, N.Y. 1982). Such polymerization methods include catalysis by strong proton or Lewis acids, by heteropoly acids, as well as by perfluorosulfonic acids or acid resins. In some instances it may be advantageous to use a polymerization promoter, such as a carboxylic acid anhydride, as disclosed in U.S. Pat. No. 4,163,115. In these cases the primary polymer products are diesters, which need to be hydrolyzed in a subsequent step to obtain the desired polyether glycols.

Other methods for manufacture of copolyether glycols having normal molar incorporations of alkylene oxide are known in the art, such as for example as shown in U.S. Pat. Nos. 4,192,943; 4,228,272; 4,564,671; and 4,585,592; and in published patent applications WO 03/076453 and WO 03/076494. For example, U.S. Pat. No. 4,564,671 discloses a process for polymerization of THF with a 1,2-alkylene oxide in the presence of a compound containing reactive hydrogen and a fixed-bed clay catalyst in which less than 30% by weight of a mixture of THF, 1,2-alkylene oxide, and a compound containing reactive hydrogen is added to the reaction mixture, which is then recycled to the reactor. U.S. Pat. No. 4,728,722 discloses such polymerization batchwise with a 1,2-alkylene oxide in the presence of compounds containing reactive hydrogen over a bleaching earth or zeolite catalyst, the 1,2-alkylene oxide being fed to the reaction mixture in such a manner that the concentration of the 1,2-alkylene oxide in the reaction mixture is kept below 2% by weight during the polymerization. U.S. Pat. No. 5,268,345 discloses polymerization of THF with ethylene oxide when montmorillonite catalyst which has been regenerated by the process disclosed therein is used. U.S. Pat. No. 4,192,943 discloses that copolyether glycol based on THF and alkylene oxides varies with the method of production. U.S. Pat. No. 4,677,231 discloses use of diluent or solvent for purification of copolyether glycol having a normal molar incorporation of alkylene oxide manufactured in a polymerization process utilizing a normal concentration of alkylene oxide as a feedstock component.

None of the above publications teach the continuous production of copolyether glycols by polymerization of a reaction mixture comprising tetrahydrofuran and a very high concentration of at least one alkylene oxide in the presence of an acid catalyst, at least one compound containing reactive hydrogen atoms, and a specific diluent or solvent. None of the above publications teach the continuous production of copolyether glycols having a high incorporation, such as, for example at least about 50 mol %, of alkylene oxide. Adjusting the methods of the above publications to produce copolyether glycols by polymerization of a reaction mixture comprising tetrahydrofuran and a high concentration of at least one alkylene oxide in the presence of an acid catalyst and at least one compound containing reactive hydrogen atoms adds complexity, processing limitations, and/or cost to the manufacturing process. A simple economical process for copolymerization of a reaction mixture comprising tetrahydrofuran and a high concentration of at least one alkylene oxide in the presence of an acid catalyst and at least one compound containing reactive hydrogen atoms to produce copolyether glycol having a high molar incorporation of alkylene oxide is needed.

SUMMARY OF THE INVENTION

The present invention provides a simple economical continuous process for the polymerization of THF and high concentrations of alkylene oxide to manufacture copolyether glycol having a high molar incorporation of alkylene oxide which minimizes or avoids high temperature and viscosity problems associated with such a process. The process comprises the steps of:

a) polymerizing from about 15 to about 90 parts, for example from about 15 to about 75 parts, feedstock comprising from about 10 to about 90 wt %, for example from about 30 to about 70 wt %, tetrahydrofuran and from about 10 to about 90 wt %, for example from about 20 to about 50 wt %, of at least one alkylene oxide; in the presence of from about 0.1 to about 5 wt %, for example from about 0.1 to about 2 wt %, of at least one compound containing reactive hydrogen atoms; from greater than 0 to about 40 wt %, for example from about 10 to about 30 wt %, of specific diluent or solvent, hereinafter more particularly described; and an acid catalyst, hereinafter more particularly described; at a temperature of from about 30° C. to about 80° C., to produce a polymerization product comprising copolyether glycol having a high molar incorporation of alkylene oxide of at least about 50 mol %, a mean molecular weight of from about 650 dalton to about 4000 dalton and a viscosity of from about 80 cP to about 4000 cP; and b) recovering from the polymerization product the copolyether glycol having a high molar incorporation of alkylene oxide, a mean molecular weight of from about 650 dalton to about 4000 dalton and a viscosity of from about 80 cP to about 4000 cP.

The present invention, therefore, provides a continuous process for manufacturing poly(tetramethylene-co-ethyleneether) glycol having a high molar incorporation of ethylene oxide, a mean molecular weight of from about 650 dalton to about 4000 dalton, and a viscosity of from about 80 cP to about 4000 cP comprising the steps of:

a) polymerizing from about 15 to about 90 parts, for example from about 15 to about 75 parts, feedstock comprising from about 10 to about 90 wt %, for example from about 30 to about 70 wt %, tetrahydrofuran and from about 10 to about 90 wt %, for example from about 20 to about 50 wt %, of ethylene oxide; in the presence of from about 0.1 to about 5 wt %, for example from about 0.1 to about 2 wt %, of at least one compound containing reactive hydrogen atoms; from greater than 0 to about 40 wt %, for example from about 10 to about 30 wt %, of specific diluent or solvent, hereinafter more particularly described; and an acid catalyst, hereinafter more particularly described; at a temperature of from about 30° C. to about 80° C., to produce a polymerization product comprising poly(tetramethylene-co-ethyleneether) glycol having a high molar incorporation of ethylene oxide of at least about 50 mol %, a mean molecular weight of from about 650 dalton to about 4000 dalton and a viscosity of from about 80 cP to about 4000 cP; and b) recovering from the polymerization product the poly(tetramethylene-co-ethyleneether) glycol having a high molar incorporation of ethylene oxide, a mean molecular weight of from about 650 dalton to about 4000 dalton and a viscosity of from about 80 cP to about 4000 cP.

An embodiment of the present invention provides a simple economical continuous process for the copolymerization of THF and high concentrations of alkylene oxide to manufacture copolyether glycol having a high molar incorporation of alkylene oxide which minimizes or avoids high temperature and viscosity problems associated with such a process which comprises the steps of:

a') polymerizing from about 15 to about 90 parts, for example from about 15 to about 75 parts, feedstock comprising from about 10 to about 90 wt %, for example from about 30 to about 70 wt %, tetrahydrofuran and from about 10 to about 90 wt %, for example from about 20 to about 50 wt %, of at least one alkylene oxide; in the presence of from about 0.1 to about 5 wt %, for example from about 0.1 to about 2 wt %, of at least one compound containing reactive hydrogen atoms; from greater than 0 to about 40 wt %, for example from about 10 to about 30 wt %, of specific diluent or solvent, hereinafter more particularly described; and an acid catalyst, hereinafter more particularly described; at a temperature of from about 30° C. to about 80° C., to produce a polymerization product mixture comprising copolyether glycol having a high molar incorporation of alkylene oxide of at least about 50 mol %, a mean molecular weight of from about 650 dalton to about 4000 dalton and a viscosity of from about 80 cP to about 4000 cP, oligomeric cyclic ether (OCE), at least one dimer of the alkylene oxide, e.g. 1,4-dioxane, linear short chain copolyether glycol and tetrahydrofuran;

b') separating a majority of the tetrahydrofuran and the dimer of the alkylene oxide from the polymerization product mixture of step a') to produce a crude product mixture comprising OCE, copolyether glycol having a high molar incorporation of alkylene oxide of at least about 50 mol %, a mean molecular weight of from about 650 dalton to about 4000 dalton and a viscosity of from about 80 cP to about 4000 cP, and linear short chain copolyether glycol;

c') separating at least a portion of the OCE and linear short chain copolyether glycol from the crude product mixture of step b') to produce an OCE stream comprising OCE and linear short chain copolyether glycol, and a product stream comprising copolyether glycol having a high molar incorporation of alkylene oxide of at least about 50 mol %, a mean molecular weight of from about 650 dalton to about 4000 dalton and a viscosity of from about 80 cP to about 4000 cP;

d') recovering from the product stream of step c') the copolyether glycol having a high molar incorporation of alkylene oxide, a mean molecular weight of from about 650 dalton to about 4000 dalton and a viscosity of from about 80 cP to about 4000 cP;

e') optionally recycling at least a portion of the OCE stream of step c') to the polymerization step a'); and f') optionally separating at least a portion of the dimer of the alkylene oxide obtained in step b') from the tetrahydrofuran obtained in step b'), and optionally recycling to polymerization step a') at least a portion of the tetrahydrofuran so obtained.

DETAILED DESCRIPTION OF THE INVENTION

As a result of intense research in view of the above, we have discovered a continuous process whereby we can manufacture copolyether glycols having a high molar incorporation of alkylene oxide of at least about 50 mol %, for example from about 50 to about 85 mol %, a mean molecular weight of from about 650 dalton to about 4000 dalton and a viscosity of from about 80 cP to about 4000 cP, which process minimizes or avoids high temperature and viscosity problems associated with such a process. The process of the invention comprises the step of polymerization of THF and a high concentration of at least one alkylene oxide in the presence of an acid catalyst, at least one compound containing reactive hydrogen atoms and specific diluent or solvent. Following the polymerization step, copolyether glycols having a high molar incorporation of alkylene oxide of at least about 50 mol %, a mean molecular weight of from about 650 dalton to about 4000 dalton and a viscosity of from about 80 cP to about 4000 cP are recovered. In this process, a very high percentage, such as for example, from about 95 to about 100 wt %, of the alkylene oxide in the feedstock to the polymerization step is consumed in the reaction. In an embodiment of the present invention, unreacted THF, unreacted alkylene oxide, dimer of the alkylene oxide, and any lower boiling components present are removed, and the copolyether glycol fraction is, for example, distilled to remove at least a portion of the OCE. The OCE portion removed may then be recycled to the polymerization step, where it can be incorporated into the copolyether glycol product.

The term "polymerization", as used herein, unless otherwise indicated, includes the term "copolymerization" within its meaning.

The term "PTMEG", as used herein, unless otherwise indicated, means poly(tetramethylene ether glycol). PTMEG is also known as polyoxybutylene glycol.

The term "copolyether glycol", as used herein in the singular, unless otherwise indicated, means copolymers of tetrahydrofuran and at least one alkylene oxide, which are also known as polyoxybutylene polyoxyalkylene glycols. An example of a copolyether glycol is a copolymer of tetrahydrofuran and ethylene oxide. This copolyether glycol is also known as poly(tetramethylene-co-ethyleneether) glycol.

The term "linear short chain copolyether glycol", as used herein in the singular, unless otherwise indicated, means copolyether glycols having a molecular weight of from about 130 to about 400 dalton. An example of a linear short chain copolyether glycol is $HOCH_2CH_2OCH_2CH_2CH_2CH_2OH$.

The term "THF", as used herein, unless otherwise indicated, means tetrahydrofuran and includes within its meaning alkyl substituted tetrahydrofuran capable of copolymerizing with THF, for example 2-methyltetrahydrofuran, 3-methyltetrahydrofuran, and 3-ethyltetrahydrofuran.

The term "alkylene oxide", as used herein, unless otherwise indicated, means a compound containing two, three or four carbon atoms in its alkylene oxide ring. The alkylene oxide can be unsubstituted or substituted with, for example, linear or branched alkyl of 1 to 6 carbon atoms, or aryl which is unsubstituted or substituted by alkyl and/or alkoxy of 1 or 2 carbon atoms, or halogen atoms such as chlorine or fluorine. Examples of such compounds include ethylene oxide ("EO"); 1,2-propylene oxide; 1,3-propylene oxide; 1,2-butylene oxide; 1,3-butylene oxide; 2,3-butylene oxide; styrene oxide; 2,2-bis-chloromethyl-1,3-propylene oxide; epichlorohydrin; perfluoroalkyl oxiranes, for example (1H,1H-perfluoropentyl) oxirane; and combinations thereof.

The term "oligomeric cyclic ether" (OCE), as used herein in the singular, unless otherwise indicated, means one or more of the series of cyclic compounds comprised of constituent ether fragments derived from at least one alkylene oxide and/or THF and arranged in a random fashion within the cyclic compound. Although used herein as a singular term, OCE refers to the distribution of cyclic ethers formed during polymerization of the THF and at least one alkylene oxide and thus refers to a series of individual compounds. As used herein, the term OCE excludes the dimer of the alkylene oxide co-monomer used in the polymerization, even though such a dimer is an example of cyclic ether. For example, in the case where the alkylene oxide is ethylene oxide, the dimer of the alkylene oxide is 1,4-dioxane. By excluding the dimer of the alkylene oxide from the term OCE, this definition of OCE may differ from that of OCE disclosed in the prior art.

In the case of copolymerization of, for example, ethylene oxide and THF, OCE comprises the series of cyclic oligomeric ethers comprised of ring-opened ethylene oxide and ring-opened THF repeat units, as represented by the formula $[(CH_2CH_2O)_x(CH_2CH_2CH_2CH_2O)_y]_n$. Examples of such OCE components are shown in Table A below. Two isomers were observed for molecular weight 232. Other higher molecular weight OCE components not listed in the Table are likely formed as well.

TABLE A

Individual OCE's Identified in EO/THF Polymerization

| Value for x | Value for y | Molecular weight |
|---|---|---|
| 1 | 2 | 188 |
| 1 | 3 | 260 |
| 1 | 4 | 332 |
| 1 | 5 | 404 |
| 2 | 2 | 232 |
| 2 | 3 | 304 |
| 2 | 4 | 376 |
| 3 | 1 | 204 |
| 3 | 2 | 276 |
| 3 | 3 | 348 |
| 4 | 2 | 320 |
| 4 | 3 | 392 |

One embodiment of the present invention is a continuous process for the copolymerization of feedstock comprising THF and a high concentration of alkylene oxide which minimizes or avoids high temperature and viscosity problems associated with such a process. Another embodiment of the present invention is a continuous process for the copolymerization of feedstock comprising THF and a high concentration of ethylene oxide which minimizes or avoids high temperature and viscosity problems associated with such a process. A further embodiment of the present invention is a copolyether glycol product having a high molar incorporation, for example at least about 50 mol %, of alkylene oxide.

The THF used as a reactant in the process of the invention can be any of those commercially available. Typically, the THF has a water content of less than about 0.03% by weight and a peroxide content of less than about 0.005% by weight. If the THF contains unsaturated compounds, their concentration should be such that they do not have a detrimental effect on the polymerization process of the present invention or the polymerization product thereof. For example, for some applications it is preferred that the copolyether glycol product of the present invention having a high molar concentration of alkylene oxide has low APHA color, such as, for example less than about 100 APHA units. Optionally, the THF can contain an oxidation inhibitor such as butylated hydroxytoluene (BHT) to prevent formation of undesirable byproducts and color. If desired, one or more alkyl substituted THF's capable of copolymerizing with THF can be used as a co-reactant, in an amount from about 0.1 to about 70% by weight of the THF. Examples of such alkyl substituted THF's include 2-methyltetrahydrofuran, 3-methyltetrahydrofuran, and 3-ethyltetrahydrofuran.

The alkylene oxide used as a reactant in the present process, as above indicated, may be a compound containing two, three or four carbon atoms in its alkylene oxide ring. It may be selected from, for example, the group consisting of ethylene oxide; 1,2-propylene oxide; 1,3-propylene oxide; 1,2-butylene oxide; 2,3-butylene oxide; 1,3-butylene oxide and combinations thereof. Preferably, the alkylene oxide has a water content of less than about 0.03% by weight, a total aldehyde content of less than about 0.01% by weight, and an acidity (as acetic acid) of less than about 0.002% by weight. The alkylene oxide should be low in color and non-volatile residue.

If, for example, the alkylene oxide reactant is EO, it can be any of those commercially available. Preferably, the EO has a water content of less than about 0.03% by weight, a total aldehyde content of less than about 0.01% by weight, and an acidity (as acetic acid) of less than about 0.002% by weight. The EO should be low in color and non-volatile residue.

Examples of compounds containing reactive hydrogen atoms which are suitable for use in the process of this invention include water, ethylene glycol, 1,4-butanediol, PTMEG having a molecular weight of from about 162 to about 400 dalton, copolyether glycols having a molecular weight of from about 134 to 400 dalton, and combinations thereof. An example of a suitable copolyether glycol for use as a compound containing reactive hydrogen atoms is poly(tetramethylene-co-ethyleneether) glycol having a molecular weight of from about 134 to about 400 dalton. These compounds could also be used in combination to regulate the molecular weight of the final product.

The acid catalyst useful in the present invention includes broadly any strong acid and super acid catalyst capable of ring-opening polymerization of cyclic ethers as generally known in the art. The catalyst may be homogeneous or heterogeneous. Heterogeneous catalysts may be used in extrudate form or in suspension. The use of a heterogeneous catalyst may facilitate separation of product from the catalyst, especially when the catalyst is used in extrudate form.

Suitable homogeneous acid catalysts for use herein include, by way of example but not by limitation, heteropolyacids as disclosed, for example, in U.S. Pat. No. 4,658,065.

Suitable heterogeneous acid catalysts for use herein include, by way of example but not by limitation, zeolites optionally activated by acid treatment, sulfate-doped zirconium dioxide, supported catalysts comprising at least one catalytically active oxygen-containing molybdenum and/or tungsten compound or a mixture of such compounds applied to an oxidic support, polymeric catalysts which contain sulfonic acid groups (optionally with or without carboxylic acid groups), and combinations thereof.

Natural or synthetic zeolites, a class of aluminum hydrosilicates (also known as crystalline aluminosilicates), having an open structure of three-dimensional networks with defined pores and channels in the crystal, may be used as heterogeneous acid catalysts in the process of the present invention. Suitable zeolites for use herein have a $SiO_2:Al_2O_3$ molar ratio ranging from about 4:1 to about 100:1, for example from about 6:1 to about 90:1, or from about 10:1 to about 80:1. The particle size of the zeolite may be less than about 0.5 micron, for example less than about 0.1 micron, or less than about 0.05 micron. The zeolites are used in the hydrogen (acid) form and may optionally be activated by acid treatment. The acidified zeolites for use herein are exemplified by faujasite (described in EP-A 492807), zeolite Y, zeolite Beta (described in U.S. Pat. No. 3,308,069), ZSM-5 (described in U.S. Pat. No. 3,702,886), MCM-22 (described in U.S. Pat. No. 4,954,325), MCM-36 (described in U.S. Pat. No. 5,250,277), MCM-49 (described in U.S. Pat. No. 5,236,575), MCM-56 (described in U.S. Pat. No. 5,362,697), PSH-3 (described in U.S. Pat. No. 4,439,409), SSZ-25 (described in U.S. Pat. No. 4,826,667) and the like.

The preparation of sulfate-doped zirconium dioxide is disclosed, for example, in U.S. Pat. No. 5,149,862.

Also useful as heterogeneous catalysts are those comprising at least one catalytically active oxygen-containing molybdenum and/or tungsten compound or a mixture of such compounds applied to an oxidic support as disclosed, for example, in U.S. Pat. No. 6,197,979. Examples of suitable oxidic supports include zirconium dioxide, titanium dioxide, hafnium oxide, yttrium oxide, iron (III) oxide, aluminum oxide, tin (IV) oxide, silicon dioxide, zinc oxide or mixture of these oxides. The supported catalysts may be, for example, additionally doped with sulfate or phosphate groups, as disclosed in German patent application DE-A 44 33606, pretreated with a reducing agent as described in DE 196 41481, or calcined and further comprising a promoter comprising at least one element or compound of an element of groups 2, 3 (including the lanthanides), 5, 6, 7, 8, and 14 of the periodic table of the elements, as disclosed in DE 196 49803.

The preferred above mentioned heterogeneous catalysts, for example, natural or synthetic zeolites, oxidic-supported active oxygen-containing molybdenum and/or tungsten, and zirconium dioxide, are spherical in shape, so that they are more attrition resistant and suitable for use in a continuously stirred tank reactor (CSTR).

Among the suitable polymeric catalysts which contain sulfonic acid groups, optionally with or without carboxylic acid groups, are those whose polymer chains are copolymers of tetrafluoroethylene or chlorotrifluoroethylene and a perfluoroalkyl vinyl ether containing sulfonic acid group precursors (again with or without carboxylic acid groups) as disclosed in U.S. Pat. Nos. 4,163,115 and 5,118,869 and as supplied commercially by E. I. du Pont de Nemours and Company under the tradename Nafion®. Such polymeric catalysts are also referred to as polymers comprising alpha-fluorosulfonic acids. An example of this type of catalyst for use herein is a perfluorosulfonic acid resin, i.e. it comprises a perfluorocarbon backbone and the side chain is represented by the formula $—O—CF_2CF(CF_3)—O—CF_2CF_2SO_3H$. Polymers of this type are disclosed in U.S. Pat. No. 3,282,875 and can be made by copolymerization of tetrafluoroethylene (TFE) and the perfluorinated vinyl ether $CF_2=CF—O—CF_2CF(CF_3)—O—CF_2CF_2SO_2F$, perfluoro (3,6-dioxa-4-methyl-7-octenesulfonyl fluoride) (PDMOF), followed by conversion to sulfonate groups by hydrolysis of the sulfonyl fluoride groups and ion exchanged as necessary to convert them to the desired acidic form. See also U.S. Pat. No. 4,139,567 for a description of perfluorosulfonic acid resin catalyst useful herein.

The polymeric heterogeneous catalysts which can be employed according to the present invention can be used in the form of powders or as shaped bodies, for example in the form of beads, cylindrical extrudates, spheres, rings, spirals, or granules. The perfluorosulfonic acid resin type of polymeric heterogeneous catalyst can be pretreated (hydrotreated) by placing it along with deionized water at a weight ratio of resin/water of from about ¼ to about 1/10 into a clean stainless steel autoclave, heating to a temperature of, for example, from about 170° C. to about 210° C. under agitation, and holding at that temperature for up to about 12 hours, for example from about 1 hour to about 8 hours.

The polymerization step a) or a') of the present invention must be carried out with a suitable diluent or solvent. Such diluent or solvent in the polymerization step includes, for example, inert diluents or solvents, such as one or more aliphatic, cycloaliphatic, or aromatic hydrocarbons. It is also possible to use the dimer(s) of the alkylene oxide(s) comonomers, for example 1,4-dioxane in the case of ethylene oxide, as a diluent or solvent, alone or in combination with another diluent or solvent, for example an aliphatic, cycloaliphatic, or aromatic hydrocarbon.

The polymerization step of the present invention is generally carried out at from about 30° C. to about 80° C., such as from about 50° C. to about 72° C., for example from about 50° C. to about 65° C. Such a temperature range is suitable for OCE incorporation into the copolyether glycol product in the present diluent or solvent-assisted process. The pressure employed is generally from about 200 to about 800 mmHg, for example from about 300 to about 500 mmHg, depending on the diluent or solvent used.

To avoid the formation of peroxides, the polymerization step of the present process may be conducted under an inert gas atmosphere. Non-limiting examples of suitable inert gases for use herein include nitrogen, carbon dioxide, or the noble gases.

The polymerization step of the present invention can also be carried out in the presence of hydrogen at hydrogen pressure of from about 0.1 to about 10 bar.

The polymerization process step of the present invention is carried out continuously to maintain consistency in the products, with one or more other steps of the process being carried out continuously or batch wise, i.e. the feed can be prepared in a large batch and polymerized continuously until the batch is consumed. Similarly, the product could be stored and processed after the batch is completely processed in the polymerization reactor.

The polymerization reaction can be carried out in conventional reactors or reactor assemblies suitable for continuous processes in a suspension or fixed-bed mode, for example in loop reactors or stirred reactors in the case of a suspension process or in tube reactors or fixed-bed reactors in the case of a fixed-bed process. A continually stirred tank reactor (CSTR) is desirable due to the need for good mixing in the present process, especially when the products are produced in a single pass mode.

In such a continuous polymerization reactor apparatus, the catalyst can, if desired, be pretreated before or after it has been introduced into the reactor(s). Examples of catalyst pretreatments include drying by means of gases, for example air or nitrogen, which have been heated to 80-200° C., or, in the case of supported catalysts comprising a catalytically active amount of at least one oxygen-containing molybdenum and/or tungsten compound, pretreatment with a reducing agent as is disclosed in DE 19641481. The catalyst can also be used without pretreatment.

In a fixed-bed process mode, the polymerization reactor apparatus can be operated in the upflow mode, that is, the reaction mixture is conveyed from the bottom upward, or in the downflow mode, that is, the reaction mixture is conveyed through the reactor from the top downward.

The polymerization reactor can be operated using a single pass without internal recirculation of product, such as in a CSTR. The polymerization reactor can also be operated in the circulation mode, i.e. the polymerization mixture leaving the reactor is circulated. In the circulation mode, the ratio of recycle to feed is less than 100:1, for example less than 50:1, or for example less than 40:1.

Feedstock can be introduced to the polymerization reactor using delivery systems common in current engineering practice either batchwise or continuously. A preferred method of feed delivery combines, for example EO and THF, as a liquid mixed feed to the reactor, for example a CSTR, in continuous fashion along with the other feed ingredients. The compound containing reactive hydrogen and any recycled OCE streams are metered independently or in ratio-fashion to the reactor. Part of or an entire THF-rich stream separated downstream of the polymerization reactor can be recycled and used in place of part of the neat THF feed. The range of alkylene oxide, e.g. EO, in the feed may be from about 10 to about 90 wt %, for example from about 20 to about 50 wt %. The range of THF in the feed is from about 10 to about 90 wt %, for example from about 30 to about 70 wt %. The range of OCE in the feed is from 0 (prior to any recycle of OCE stream separated downstream) to about 20 wt %, for example from about 0 to about 15 wt %. The range of linear short chain copolyether glycols in the feed is from 0 (prior to any recycle of OCE stream separated downstream) to about 10 wt %, for example from 0 (prior to any recycle of OCE stream separated downstream) to about 5 wt %. The range of the compound containing reactive hydrogen may be from about 0.1 to about 5 wt % as water, for example from about 0.1 to about 2 wt %. The range of suitable diluent or solvent in the feed is from greater than 0 to about 40 wt %, for example from about 10 to about 30 wt %.

If the polymerization has been carried out in the suspension mode, the major part of the polymerization catalyst requires separation from the polymerization product mixture, i.e. retained in the polymerization reactor, in the work-up of the output from the polymerization step, for example by filtration, decantation or centrifugation. In other words, the resulting polymerization product mixture may be passed directly to the step of separation of THF and alkylene oxide dimer from the polymerization product mixture, or optionally it may be treated first to remove any catalyst fines or downstream products of the catalyst before being passed to the separation step.

The molar incorporation of alkylene oxide, e.g. ethylene oxide, in the copolyether glycol product from the polymerization reaction step of this invention is at least about 50 mol %, for example from about 50 to about 85 mol %. The concentration of the copolyether glycol in the polymerization reaction step product stream is less than about 75 wt %, for example from about 40 to less than about 75 wt %, e.g. from about 50 to about 70 wt %.

In the embodiment of the present process involving a step of separating a majority of the THF and alkylene oxide dimer, and alkylene oxide, from the polymerization product mixture, e.g. step b') above, it can be carried out either batchwise or continuously. By majority of THF and dimer in this step we mean from at least about 95 wt % to about 100 wt %, for example at least about 98 wt %. The separation is performed by distillation which separates the majority of the THF, the alkylene oxide, the alkylene oxide dimer, and any low boilers such as acetaldehyde or 2-methyl-1,3-dioxolane from the polymerization product mixture. The separation of the THF in this step can in principle be carried out in one distillation step, or it can be carried out in a plurality of distillation steps, for example two or three distillation steps followed by a stripping step. It is advantageous to carry out the distillation steps under different pressures.

The configuration of the separation operation is dependent on the alkylene oxide, the compound(s) containing reactive hydrogen atoms used in the polymerization step, and the diluent used. Depending on the separation task, possible distillation apparatuses are appropriate columns or evaporators such as falling film evaporators or thin film evaporators. It may also be advantageous to use tray or packed columns.

Following are disclosed in more detail various non-limiting embodiments for the separation of THF and alkylene oxide dimer from the polymerization product mixture when using THF, ethylene oxide (EO), and water in the polymerization step.

The removal of the major part of the unreacted THF at nearly atmospheric pressure (for example, at 450-900 mm Hg) may be carried out in a continuously operated circulating flash evaporator. The polymerization product mixture, optionally having been filtered to remove any catalyst fines or downstream products of the catalyst, is fed into a flash evaporator via a heated circulation stream into the side near the top of the evaporator where it flashes. The polymerization product mixture from this embodiment, e.g. step a') above, usually has a THF content of from about 5 wt % to about 40 wt %, depending upon the operating temperature and pressure selected. The 1,4-dioxane is generally present from about 0.1 wt % to about 5 wt %. The water content is generally not more than about 2500 ppm, the alkylene oxide, e.g. EO, content is from about 200 ppm to about 5000 ppm, and the 2-methyl-1,3-dioxolane concentration is from about 200 ppm to about 2000 ppm. Other compounds such as ethylene glycol (typically from about 100 ppm to about 1000 ppm) and 1,4-butanediol (typically from about 30 ppm to about 300 ppm) are also present. At a circulating temperature at the top of from about 100° C. to about 160° C. and a temperature at the bottom of from about 100° C. to about 200° C., for example from about 100° C. to about 120° C., the major part of the water, unreacted alkylene oxide, e.g. EO, and acetaldehyde in admixture with THF and 1,4-dioxane are distilled off via the top. The tetrahydrofuran fraction obtained as distillate is condensed and all or some of it, such as for example at least about 99%, can be subsequently returned to the polymerization step after purification, for example by distillation. The crude product mixture obtained as distillation residue at the bottom of the evaporator comprises copolyether glycol having a high molar incorporation of alkylene oxide and a mean molecular weight of from about 650 dalton to about 5000 dalton, OCE, and a very small amount of THF, dimer of the alkylene oxide, e.g. 1,4-dioxane, the diluent and other low boilers.

As an alternative, the removal of the major part of the unreacted THF at atmospheric pressure can be carried out in a thin film evaporator or distillation column, for example a falling film evaporator with circulation, which is operated at from about 100° C. to about 200° C., for example from about 120° C. to about 180° C. The composition of the THF fraction obtained as distillate and that of the crude product mixture obtained as distillation residue correspond to those described above.

The distillation residue obtained from the first distillation step is subsequently freed of most of the residual THF under reduced pressure, for example in a second circulating flash evaporator operating at about 100° C. to about 150° C. (for example at about 120° C.) and from about 80 mm Hg to about 160 mm Hg (for example at about 130 mm Hg) with the circulation temperature from about 2° C. to about 5° C. higher than the evaporator temperature. Crude product leaving from the second recovery step generally contains less than about 10 ppm EO, less than about 50 ppm water, less than about 200 ppm of 2-methyl-1,3-dioxolane, less than about 3000 ppm 1,4-dioxane, and less than about 1.5 wt % THF. All or some of the THF fraction obtained as distillate, which comprises predominantly THF, such as for example at least about 99%, can be returned to the polymerization step after purification in the distillation column. The purified diluent can also be returned back to the polymerization step in a similar manner as that of THF.

To reduce the remaining THF and dimer, e.g. 1,4-dioxane, a third step using ultra low vacuum, for example less than 3 torr, or inert gas stripping, for example with nitrogen, can be employed. The third step could use thin film evaporators, wiped film evaporators, disc and donut contactors, or packed columns. For example, when using nitrogen stripping in a packed column with nitrogen at about 170° C. feed at the bottom and crude product at about 120° C. feed at the top, the crude product leaving the bottom of the column might have only dropped by about 1 to 2° C., for example to about 118° C. to 119° C. The EO and water content would generally be less than about 1 ppm, the 2-methyl-1,3-dioxolane concentration less than about 3 ppm, the THF concentration less than about 40 ppm, and the 1,4-dioxane concentration less than about 250 ppm. The left over diluent will depend on the boiling point of the compound, for example when 1,4-dioxane is used as the diluent, it would be less than 250 ppm. Other high boiling compounds like ethylene glycol and 1,4-butanediol would be slightly reduced but would mainly remain in the crude product.

After a majority of the THF and the alkylene oxide dimer have been separated from the polymerization product mixture to produce a crude product mixture comprising OCE, copolyether glycol having a high molar incorporation of alkylene oxide, a mean molecular weight of from about 650 dalton to about 4000 dalton and a viscosity of from about 80 cP to about 4000 cP, and linear short chain copolyether glycol, the crude product mixture may be treated to remove any catalyst fines or downstream products of the catalyst before being passed to the step of separation of at least a portion of the OCE from the crude product mixture.

Either or both of the polymerization product mixture and the crude product mixture may be treated to remove any catalyst fines or downstream products of the catalyst which may result, for example, from attrition of or leaching of the catalyst during pretreatment or during polymerization. Examples of these include finely divided, suspended or emulsified abraded catalyst comprising unchanged catalyst, catalyst support and/or the active catalyst component. In the case of supported catalysts comprising an oxidic support material to which oxygen-containing molybdenum or tungsten compounds or mixtures of such compounds have been applied as catalytically active compounds, the abraded material is accordingly unchanged catalyst, support material and/or active oxygen-containing molybdenum or tungsten components. Downstream products of the catalyst are, for example, dissolved cations or anions of the active components, for example tungsten or molybdenum cations or molybdate or tungstate anions. In the case of ion exchangers containing sulfonic acid groups, for example Nafion®, the downstream product can include fluoride ions and/or sulfonic acids; in the case of the sulfate-doped metal oxides, the downstream product can include sulfuric acid and/or metal cations or anions.

Although the amount of such catalyst and/or downstream products of the catalyst is small and generally does not exceed 0.1% by weight, for example 0.01% by weight, based on the output from the polymerization step, this material should be removed or it would otherwise remain in the copolyether glycol and change the specification data and thereby the properties of the copolyether glycol product.

The catalyst and/or downstream products of the catalyst can be separated from the polymerization product mixture and/or the crude product mixture by filtration, for example ultrafiltration, adsorption on solid adsorbents, for example activated carbon, and/or by means of ion exchangers, for example molecular sieves having pore sizes of from 3 to 10 angstroms. Adsorption on solid adsorbents can also be combined with neutralization using acids or bases. Filtration also removes other insoluble impurities in the product from the feed, i.e. high molecular weight polyethylene glycol (PEG) in EO, or from the process or equipment, i.e. rust and other foreign materials.

Separating at least a portion, such as from about 4 to about 30 wt %, for example from about 4 to about 20 wt %, of the OCE from the crude product mixture, and from about 1 to about 10 wt %, for example from about 1 to about 8 wt %, of the linear short chain copolyether glycol from the crude product mixture, e.g. of step b'), to produce an OCE stream comprising OCE and linear short chain copolyether glycol, and a product stream comprising from about 95.0 to about 99.9 wt %, for example from about 98.0 to about 99.8 wt %, copolyether glycol, e.g. in step c'), can be carried out in practice by distillation using a conventional reduced pressure distillation apparatus. For example, distillation can be carried out batchwise from a batch distillation apparatus, without rectification. Short-path distillation apparatuses, for example conventional film evaporators with mechanical surface distribution or automatic distribution, are advantageous. In the case of the film evaporators, the continuous procedure is generally preferred, whereas distillation from a batch distillation apparatus is carried out batchwise in most cases. Flash evaporators are also suitable for separating off the OCE. In these apparatuses, the required evaporation energy is introduced into the product in the form of sensible heat, after which the product is let down into a suitable vessel under reduced pressure. During this procedure, the OCE present therein is vaporized. The distillation can be reinforced by additional stripping with an inert gas, such as nitrogen or superheated steam. For this purpose, available thin film evaporators, falling film evaporators and/or short path distillation units are useful.

In this separation, e.g. step c'), OCE and low molecular weight copolyether glycols having a mean molecular weight of from about 200 to about 500 dalton are separated in at least one distillation step at a pressure of from about 0.1 to about 130 µbar, for example from about 1 to about 90 µbar, or for example from about 10 to about 70 µbar, and at a temperature of from about 180° C. to about 250° C., for example from about 190° C. to about 230° C., and copolyether glycol having a high molar incorporation of alkylene oxide, a mean molecular weight of from about 650 dalton to about 4000 dalton and a viscosity of from 80 cP to about 4000 cP is isolated.

In step d') a majority, such as greater than about 50 wt %, for example from greater than about 50 wt % to about 99 wt %, of the OCE stream of step c') is recovered and, if desired, recycled to polymerization step a').

Diluent or Solvent

We have discovered that using a proper diluent or solvent in the polymerization reaction mixture for the present process overcomes the deficiencies of the prior art for the copolymerization of feedstock comprising THF and high concentrations of alkylene oxide in the presence of a compound containing active hydrogen in a continuous polymerization process, such as in a CSTR, and especially when a heterogeneous catalyst is employed. The dilution of the polymerization reactor content with the specific diluent or solvent reduces the viscosity of the system and facilitates retention of the catalyst in the reactor. The diluent or solvent for use herein must have a proper boiling point so that reaction heat can be efficiently carried out by way of evaporative cooling by using the unreacted reagents and the inert diluent or solvent through an external condenser.

The diluent or solvent does not participate in the copolymerization reaction mechanism, and may be said to be inert in relation thereto. It can be, for example, one or a combination of linear or branched short chain hydrocarbons of from 5 to 8 carbon atoms, cyclic hydrocarbons of from 5 to 8 carbon atoms, stable oxygenates such as 1,4-dioxane and substituted or unsubstituted aromatic hydrocarbons. Non-limiting examples of such suitable diluents or solvents include, for example, hexane, heptane, cyclohexane, 1,4-dioxane, toluene and xylene. One important criteria is that the diluent or solvent should have a boiling point of from about 40° C. to about 150° C., for example from about 50° C. to about 120° C. This allows use of cooling water to cool the polymerization reactor, a great advantage, e.g. lower cost and process simplicity, compared to use of refrigeration systems. Evaporative cooling of the polymerization reactor is highly preferred for a commercial process of this nature. This invention facilitates evaporative cooling of the reactor content, e.g. boiling under reaction conditions, which are the combination of the temperature and the pressure.

The following Examples demonstrate the present invention and its capability for use. The invention is capable of other and different embodiments, and its several details are capable of modifications in various apparent respects, without departing from the scope and spirit of the present invention. Accordingly, the Examples are to be regarded as illustrative in nature and non-limiting.

Materials

THF was obtained from Chemcentral Corporation. EO was purchased from ARC Specialty Products and was used without further purification. The NR50 Nafion® perfluorinated sulfonic acid resin catalyst was obtained from E. I. du Pont de Nemours, Wilmington, Del., USA, and hydrotreated as above indicated. The filter aid was purchased from Aldrich Chemical, and deionized water was used.

Analytical Methods

The conversion to copolymers is defined by the weight percent of non-volatiles in the crude product mixture collected from the reactor exit, which was measured by a vacuum oven (130° C. and about 200 mmHg) removal of the volatiles in the crude product mixture.

The overall conversion was also determined by distillation of the unreacted THF, alkylene oxide and relatively volatile by-product, e.g. 1,4-dioxane, under reduced pressure and 100° C., the percent of the residue left in the roto-vap flask compared with the starting reaction mixture is the overall percent conversion. The crude product mixture was further distilled at around 200° C. under <0.3 mmHg with a short path distillation unit to remove the low molecular weight oligomers which comprised a combination of linear and cyclic molecules. The final product was characterized with NMR for molecular weight as well as the incorporation of the alkylene oxide.

Both molecular weight and percent incorporation of alkylene oxide were measured by $^1$H NMR per ASTM method D 4875. Molecular weight may also be determined by titration of hydroxyl end groups per ASTM method E 222.

The short chain glycol and OCE contents were determined by gas chromatography using a DB1701 column of 5 meter length with an FID detector. Temperature programming was commenced at 50° C., held for 2 minutes at 50° C., then ramped at 20° C./minute to 250° C., held at 250° C. for 22.5 minutes, then reduced to 50° C. Sample dilution was 1:4 by weight with toluene; and sample injection size was 1 microliter.

Hydroxyl number was determined by titration of hydroxyl end groups per ASTM method E 222.

The APHA color of the products was determined per ASTM method D 4890.

The polydispersity was determined by GPC, which was performed with an HP 1090 series II liquid chromatography with a Waters Ultrastyragel 500 Å column. THF was used as eluant. Polystyrene and PTMEG standards were used for calibration. The polydispersity was calculated as the ratio between the Mw/Mn.

The viscosity of the final product was determined using ASTM method D4878 at 40° C. and expressed in centipoise (cP).

EXAMPLES

All parts and percentages are by weight unless otherwise indicated.

Catalyst Preconditioning

Before use in the polymerization experiments described below, 90 grams (dry basis) of perfluorosulfonic acid resin catalyst and 14 grams of water were loaded into a jacketed one liter stainless steel CSTR reactor system. The catalyst was conditioned by feeding 4.8 wt % EO and 0.24 wt % water in THF for 24 hours at 58° C. with a 1.5 hour hold time. The catalyst was then treated with the same feed for 18 hours at 60° C. with a 1.2 hour hold time. The feed was then discontinued and the reactor system was allowed to cool to about 30° C. The catalyst was unloaded, filtered, rinsed with THF and then dried on a Buckner funnel at ambient conditions under the pull of house vacuum. After drying, the catalyst contained 13.5 wt % volatiles as determined by oven drying the catalyst at 130° C.

Example 1

A liquid mixture of 1830 grams of 1,4-dioxane and 35.4 grams of deionized water was charged to 2100 grams of THF in an air free 5 gallon vessel equipped with an agitator and a three baffle set to make a THF solution. The agitator was energized and 2135 grams of EO were added to the THF solution with cooling water supplied to the vessel. After 30 minutes of mixing, the mixture was transferred to a 4 gallon mixture transfer tank. The feed mixture was fed to a supply tank, made inert with nitrogen in the free space, and fed to a jacketed 0.5 liter stainless steel CSTR reactor system using a metering pump. The agitator in the reactor was equipped with a single set of impellers pitched 45 degrees to provide downward pumping of the reactor contents. The liquid feed entered at the same height as the bottom impellor.

The jacketed 0.5 liter reactor system was loaded with 45 grams of the pretreated perfluorosulfonic acid resin catalyst. The reactor was first filled with a solution of 2 wt % 1,4-butanediol and 98 wt % THF. The reactor mixture was heated to 62° C. at 500 rpm agitation and 40 psig nitrogen pressure while feed solution was added at 125 ml/hour to give a 4 hour hold-up time. The feed solution comprised 35.0 wt % ethylene oxide, 30.0 wt % 1,4-dioxane diluent or solvent, 0.58 wt % distilled water, and the balance THF. Steady-state conditions were reached after about 8 turnovers in the reactor, operated at a hold-up time of 4 hours/turnover, as evidenced by constant percent conversion based on sample weight after roto-evaporation and by constant molecular weight of the copolyether glycol product.

The wt % EO and dioxane in the crude product was determined by GC on a sample collected after the reactor exit.

Product from the experiment (both steady state and non-steady state material) was kept as an individual sample and was roto-evaporated to remove the volatiles. The roto-evaporated sample was then characterized to determine % conversion level, OCE content and the APHA color.

After roto-evaporation, the sample was filtered. Filter aid (Celpure® 300) was added to the filter paper and to the sample. Then the sample was fed to the short path distillation unit (2 or 4 inch unit from Pope Scientific). Conditions were 190° C. wall temperature, 0.1 torr vacuum and with feed rate about 300 to 500 grams/hour. After short path distillation, the residue, the copolyether glycol, was characterized for OCE content, MW, and mol % EO incorporated. The distillate, the OCE, was analyzed for short chain glycol content.

Analysis of the polymerization reactor exit mixture showed that the overall conversion was 56.4 wt % (the conversion without the 1,4-dioxane diluent would be about 80.1 wt %), the amount of low molecular weight oligomers removed by the short path distillation step was 5.0 wt %, the molecular weight of the final copolyether glycol product was 1968 g/mole (1968 dalton), and the EO incorporation was 67.8 mol %. Polydispersity of the copolyether glycol was 1.94 and color was 14 APHA units. The viscosity of the final copolyether glycol product was 517 cP.

Example 2

An experiment similar to Example 1 was carried out in a jacketed one liter stainless steel CSTR reactor system with 90 grams of the pretreated perfluorosulfonic acid resin catalyst. A 6 hours hold-up time and temperature of 56° C. was used. The feed contained 36.0 wt % EO, 30.0 wt % 1,4-dioxane diluent or solvent, 1.0 wt % distilled water and the balance THF. Under a new steady-state condition, the overall conversion was 54.8 wt %, the low molecular weight oligomers that were removed by the short-path-distillation unit was 6.6 wt %, the molecular weight of the final product was 1209 g/mol (1209 dalton), and the EO incorporation in the product had reached 71.3 mol %. Polydispersity of the copolyether glycol was 1.66 and color was 22 APHA units. The viscosity of the final copolyether glycol product was 224 cP.

Example 3

Example 2 was repeated except that a new feed was fed to the reactor which contained 36.0 wt % EO, 30.0 wt % 1,4-dioxane diluent or solvent, 0.7 wt % distilled water and the balance THF. Under a new steady-state condition, the overall conversion was 57.8 wt %, the low molecular weight oligomers that were removed by the short-path-distillation unit was 4.9 wt %, the molecular weight of the final product was 1674 g/mol (1674 dalton), and the EO incorporation in the product had reached 69.9 mol %. Polydispersity of the copolyether glycol was 1.91 and color was 52 APHA units. The viscosity of the final copolyether glycol product was 377 cP.

Comparative Example 1

Example 2 was again repeated except that the reaction was run at 58° C. and 1.2 hours hold-up time with a new feed which contained 3.9 wt % EO, 0.51 wt % deionized water and the balance THF. Under a new steady-state condition, the overall conversion was 17.6 wt %, the low molecular weight oligomers that were removed by the short-path-distillation unit was 16.7 wt %, the molecular weight of the final product was 1009 g/mol (1009 dalton), and the EO incorporation in the product was 31.9 mol %. Polydispersity of the copolyether glycol was 1.90 and color was 22 APHA units. The viscosity of the final copolyether glycol product was 204 cP.

Comparative Example 2

Example 2 was again repeated except that the reaction was run at 56° C. and 2.0 hours hold-up time with a new feed which contained 13.8 wt % EO, 0.31 wt % deionized water and the balance THF. Under a new steady-state condition, the overall conversion was 49.7 wt %, the low molecular weight oligomers that were removed by the short-path-distillation unit was 13.0 wt %, the molecular weight of the final product was 2970 g/mol (2970 dalton), and the EO incorporation in the product was 38.6 mol %. Polydispersity of the copolyether glycol was 2.60 and color was 12 APHA units. The viscosity of the final copolyether glycol product was 2891 cP.

It is observed from the results of the above comparative examples that the overall conversion increases rapidly with increasing content of the ethylene oxide in the feed under similar reaction conditions, e.g. with nearly 100% conversion of the ethylene oxide, when a diluent was not used. The data clearly show that increase of EO content in the polymerization reactor feed (for example greater than 27 wt %) or in the final product (for example greater than 50 mol %) leads to extremely high overall conversion. This will cause two practical problems in a commercial CSTR process without the suitable diluent or solvent, especially when a heterogeneous catalyst is used. First, the reaction mixture will be very viscose, and that makes it very difficult to retain the catalyst, e.g. a filtration problem. Second, the unreacted THF in the steady-state will not be sufficient to carry out the reaction heat via an evaporative cooling system which is not an issue under relatively lower overall conversions. Both problems are properly addressed by using a suitable inert diluent or solvent as in the present invention, e.g. diluting the reaction mixture to facilitate the filtration and provide more evaporative media for cooling the reactor under steady-state operation.

All patents, patent applications, test procedures, priority documents, articles, publications, manuals, and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

While the illustrative embodiments of the invention have been described with particularity, it will be understood that various other modifications will be apparent to and may be readily made by those skilled in the art without departing from the spirit and scope of the invention. Accordingly, it is not intended that the scope of the claims hereof be limited to the examples and descriptions set forth herein but rather that the claims be construed as encompassing all the features of patentable novelty which reside in the present invention, including all features which would be treated as equivalents thereof by those skilled in the art to which the invention pertains.

What is claimed is:

1. A continuous process for manufacturing copolyether glycol having a high molar incorporation of alkylene oxide of at least about 50 mol %, a mean molecular weight of from about 650 dalton to about 4000 dalton and a viscosity of from about 80 cP to about 4000 cP comprising the steps of:
    a') polymerizing in a continually stirred tank reactor from about 15 to about 90 parts feedstock comprising from about 10 to about 90 wt % tetrahydrofuran and from about 10 to about 90 wt % of at least one alkylene oxide, in the presence of from about 0.1 to about 5 wt % of at least one compound containing reactive hydrogen atoms, from 10 to about 40 wt % of inert diluent or solvent, and an acid polymeric catalyst containing sulfonic acid groups at a temperature of from about 30° C. to about 80° C. to produce a polymerization product mixture comprising OCE, copolyether glycol having a high molar incorporation of alkylene oxide of at least about 50 mol %, a mean molecular weight of from about 650 dalton to about 4000 dalton and a viscosity of from about 80 cP to about 4000 cP, at least one dimer of the alkylene oxide, linear short chain copolyether glycol and tetrahydrofuran;
    b') separating a majority of the tetrahydrofuran and the dimer of the alkylene oxide from the polymerization product mixture of step a') to produce a crude product mixture comprising OCE, copolyether glycol having a high molar incorporation of alkylene oxide of at least about 50 mol %, a mean molecular weight of from about 650 dalton to about 4000 dalton and a viscosity of from about 80 cP to about 4000 cP, and linear short chain copolyether glycol;
    c') separating at least a portion of the OCE and linear short chain copolyether glycol from the crude product mixture of step b') to produce an OCE stream comprising OCE and linear short chain copolyether glycol, and a product stream comprising copolyether glycol having a high molar incorporation of alkylene oxide of at least about 50 mol %, a mean molecular weight of from about 650 dalton to about 4000 dalton and a viscosity of from about 80 cP to about 4000 cP;
    d') optionally recycling at least a portion of the OCE stream of step c') to the polymerization step a'); and
    further comprising filtering the polymerization product mixture of step a') prior to step b'), and filtering the crude product mixture of step b') prior to step c').

2. The process of claim 1 wherein the alkylene oxide is selected from the group consisting of ethylene oxide; 1,2-propylene oxide; 1,3-propylene oxide; 1,2-butylene oxide; 2,3-butylene oxide; 1,3-butylene oxide; and combinations thereof.

3. The process of claim 1 wherein the compound containing reactive hydrogen atoms is selected from the group consisting of water, ethylene glycol, 1,4-butanediol, poly(tetramethylene ether) glycol having a molecular weight of from about 130 dalton to about 400 dalton, copolyether glycol having a molecular weight of from about 130 dalton to about 400 dalton, and combinations thereof.

4. The process of claim 1 wherein the tetrahydrofuran further comprises at least one alkyltetrahydrofuran selected from the group consisting of 2-methyltetrahydrofuran, 3-methyltetrahydrofuran, 3-ethyltetrahydrofuran and combinations thereof.

5. The process of claim 1 wherein the diluent or solvent is selected from the group consisting one or a combination of linear or branched short chain hydrocarbons of from 5 to 8 carbon atoms, cyclic hydrocarbons of from 5 to 8 carbon atoms, stable oxygenates and substituted or unsubstituted aromatic hydrocarbons, said diluent or solvent having a boiling point of from about 40° C. to about 150° C.

6. The process of claim 5 wherein the diluent or solvent comprises hexane, heptane, cyclohexane, 1,4-dioxane, toluene, xylene or combinations thereof.

7. The process of claim 1 wherein the polymeric catalyst comprises a perfluorosulfonic acid resin.

8. The process of claim 1 wherein the alkylene oxide comprises ethylene oxide and the dimer of the alkylene oxide comprises 1,4-dioxane.

9. The process of claim 1 further comprising separating at least a portion of the dimer of the alkylene oxide obtained in step b') from the tetrahydrofuran obtained in step b'), and optionally recycling to polymerization step a') at least a portion of the tetrahydrofuran so obtained.

* * * * *